(12) United States Patent
Hwang et al.

(10) Patent No.: US 7,639,414 B2
(45) Date of Patent: Dec. 29, 2009

(54) POLARIZER AND FLAT PANEL DISPLAY APPARATUS INCLUDING THE SAME

(75) Inventors: Kyu-Hwan Hwang, Suwon-si (KR); Jae-Heung Ha, Suwon-si (KR); Young-Woo Song, Suwon-si (KR); Joon-Gu Lee, Suwon-si (KR); Jong-Hyuk Lee, Suwon-si (KR); Jong-Seok Oh, Suwon-si (KR); Chul-Woo Park, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 53 days.

(21) Appl. No.: 11/837,185

(22) Filed: Aug. 10, 2007

(65) Prior Publication Data

US 2008/0037094 A1 Feb. 14, 2008

(30) Foreign Application Priority Data

Aug. 10, 2006 (KR) ............... 10-2006-0075870
Jul. 27, 2007 (KR) ............... 10-2007-0075964

(51) Int. Cl.
*G02B 26/00* (2006.01)

(52) U.S. Cl. ............................. 359/238; 359/242
(58) Field of Classification Search ............... 359/238, 359/242
See application file for complete search history.

(56) References Cited

U.S. PATENT DOCUMENTS

| 4,289,381 | A | 9/1981 | Garvin et al. | |
|---|---|---|---|---|
| 6,754,006 | B2 | 6/2004 | Barton et al. | |
| 2003/0063241 | A1* | 4/2003 | Matsumoto et al. | ......... 349/110 |
| 2007/0242352 | A1 | 10/2007 | MacMaster | |

FOREIGN PATENT DOCUMENTS

| JP | 2007-165276 | 6/2007 |
|---|---|---|
| KR | 2007-101814 | 10/2007 |

* cited by examiner

*Primary Examiner*—Jordan M. Schwartz
*Assistant Examiner*—James C Jones
(74) *Attorney, Agent, or Firm*—Stein McEwen, LLP

(57) ABSTRACT

A polarizer includes a base; a grid formed on the base; and low-reflective members formed on surfaces of the grid. The low-reflective members face an incident direction of an external light, so that a bright room contrast and a visibility can be improved.

20 Claims, 12 Drawing Sheets

EXTERNAL LIGHT

EXTERNAL LIGHT

EXTERNAL LIGHT

POLARIZER AND FLAT PANEL DISPLAY APPARATUS INCLUDING THE SAME

CROSS-REFERENCE TO RELATED APPLICATIONS

This application claims the benefits of Korean Application Nos. 2006-75870, filed Aug. 10, 2006, and 2007-75964, filed Jul. 27, 2007, in the Korean Intellectual Property Office, the disclosures of which are incorporated herein by reference.

BACKGROUND OF THE INVENTION

1. Field of the Invention

Aspects of the present invention relate to a polarizer and a flat panel display apparatus including the polarizer. More particularly, aspects of the present invention relate to a polarizer that improves the bright room contrast and visibility of a flat panel display apparatus and a flat panel display apparatus that includes the polarizer.

2. Description of the Related Art

Recently, flat panel display apparatuses have been developed that can be portable. Among the flat panel display apparatuses, field emission display apparatuses are self-emissive display apparatuses that have a wide viewing angle, a superior contrast, and a fast response speed, and thus, are considered as next generation display apparatuses. On the other hand, organic light emitting display apparatuses, which have a light emitting layer formed of an organic material, have advantages in terms of brightness, driving voltage, and response speed and can emit multi-colors.

Flat panel display apparatuses are fabricated to be thin and lightweight in order to be portable and to be usable outdoors. However, when a user watches a display apparatus outdoors, sunlight may be reflected by the screen, and thus, the bright room contrast and visibility may be degraded. In particular, organic light emitting display apparatuses may be prone to having problems due to reflection since these apparatuses include a metal reflective layer.

In order to solve the above problem, a circular polarizing plate may be disposed on a surface of the organic light emitting display apparatus. The circular polarizing plate is a linear polarizing plate that is formed as a wire grid shape by forming a linear pattern using a thin metal material. However, a grid formed of a material including metal reflects external light or reflects the light emitted from the flat panel display apparatus, and thus, the contrast is degraded and the brightness of the flat panel display apparatus is lowered.

SUMMARY OF THE INVENTION

Aspects of the present invention provide a polarizer that improves the bright room contrast and visibility of a display apparatus and a flat panel display apparatus including the polarizer.

According to an aspect of the present invention, there is provided a polarizer including: a base; a grid formed on the base: and low-reflective members formed on a surface of the grid that faces an incident direction of an external light.

The grid may comprise a plurality of parallel conductive wires, and the low-reflective members may be stacked on the parallel conductive wires in the same pattern as that of the grid.

The low-reflective members may be formed of a material including CdSe, CdTe, or ruthenium.

The low-reflective members may include an organic material.

The low-reflective members may include an inorganic material.

The low-reflective members may include a metal material and the organic material, and the metal and the organic material may form a mixture.

The low-reflective members may include a metal material and a material selected from the group consisting of an organic material, an inorganic material, and a compound of the organic material and the inorganic material.

According to another aspect of the present invention, there is provided an organic light emitting display apparatus including: a substrate; an organic light emitting device formed on the substrate to form images by directing light toward an exterior portion of the organic light emitting display apparatus; a sealing member formed on the organic light emitting device; a quarter-wave retardation layer formed on a surface of the substrate, a surface of the organic light emitting device, or a surface of the sealing member; and a linear polarizing layer formed a surface of the substrate, a surface of the organic light emitting device, a surface of the sealing member, or a surface of the quarter-wave retardation layer, wherein the linear polarizing layer is located closer to the exterior portion toward which the light of the organic light emitting device is directed to form images than is the quarter-wave retardation layer, and wherein the linear polarizing layer includes a grid and low-reflective members stacked on the grid, wherein the low reflective members are closer to an incident direction of an external light than is the grids.

The light of the organic light emitting device may be displayed toward the substrate to form images, and the low-reflective members may be formed on a surface of the grid facing the substrate.

The quarter-wave retardation layer may be formed on the linear polarizing layer, and the organic light emitting device may be formed on the quarter-wave retardation layer.

The linear polarizing layer may be formed on the substrate, the quarter-wave retardation layer may be formed on the linear polarizing layer, and the organic light emitting device may be formed on the quarter-wave retardation layer.

The quarter-wave retardation layer may be formed on the substrate, the organic light emitting device may be formed on the quarter-wave retardation layer, and the linear polarizing layer may be formed on a surface of the substrate that is opposite to the quarter-wave retardation layer.

The quarter-wave retardation layer and the linear polarizing layer may be formed on a surface of the substrate that is opposite to a surface where the organic light emitting device is formed.

The light from the organic light emitting device may be directed toward the sealing member to form images, and the linear polarizing layer may include the low-reflective members formed on a surface of the grid facing the sealing member.

The quarter-wave retardation layer may be formed on the organic light emitting device, and the linear polarizing layer may be formed on the quarter-wave retardation layer.

The display apparatus may further include: a protective layer between the organic light emitting device and the quarter-wave retardation layer.

The quarter-wave retardation layer and the linear polarizing layer may be sequentially formed on a surface of the sealing member that is opposite to a surface of the sealing member facing the organic light emitting device.

The quarter-wave retardation layer may be formed on the surface of the sealing member that faces the organic light emitting device, and the linear polarizing layer may be formed on a surface of the sealing member that is opposite to the other surface of the sealing member where the quarter-wave retardation layer is formed.

The linear polarizing layer may be formed on the surface of the sealing member that faces the organic light emitting device, and the quarter-wave retardation layer may be formed on a surface of the linear polarizing layer that faces the organic light emitting device.

The display apparatus may further include: a reflective layer between the substrate and the organic light emitting device, wherein the quarter-wave retardation layer is formed between the reflective layer and the organic light emitting device, and the linear polarizing layer is formed on the organic light emitting device.

According to another aspect of the present invention, there is provided a display apparatus that forms images by directing light through an exterior surface and that is exposed to external light striking the exterior surface from an incident direction, wherein the display apparatus comprises a polarizer formed on the exterior surface of the display apparatus or on an interior surface of the display apparatus that receives the external light and wherein the polarizer comprises a grid and low-reflective members formed on a surface of the grid that faces the incident direction of the external light.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
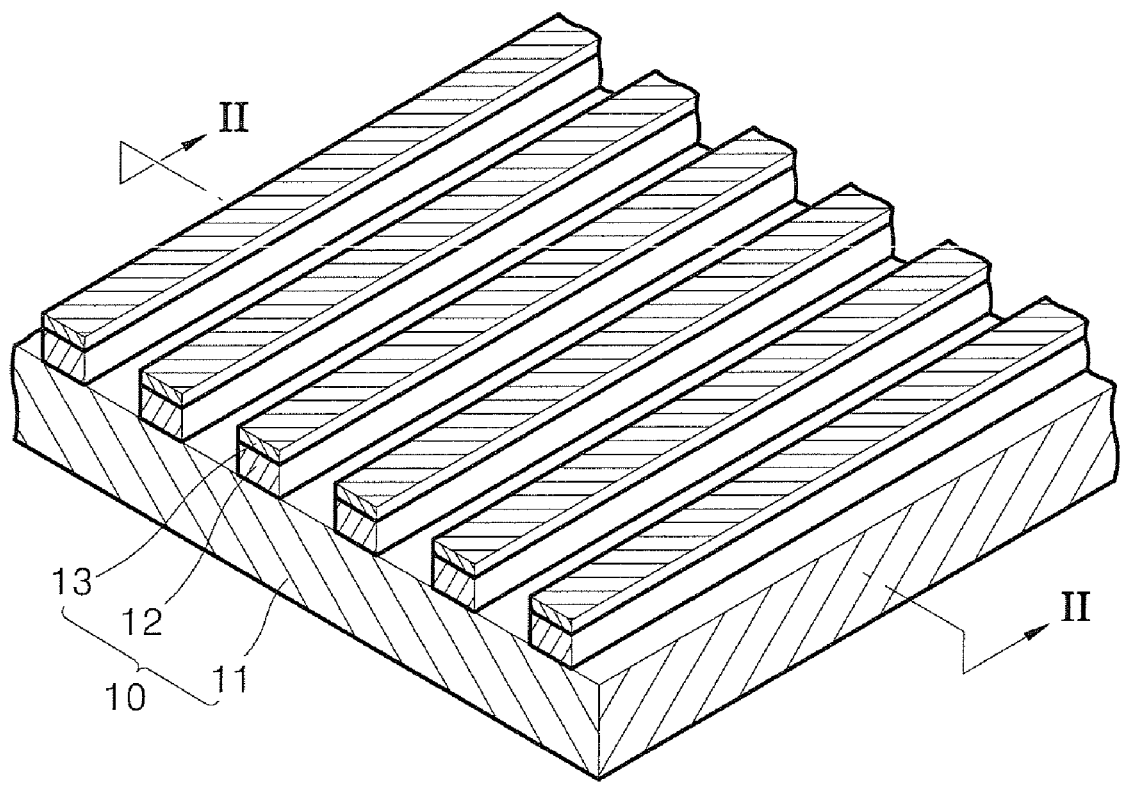
FIG. 1 is a schematic perspective view of a polarizer according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
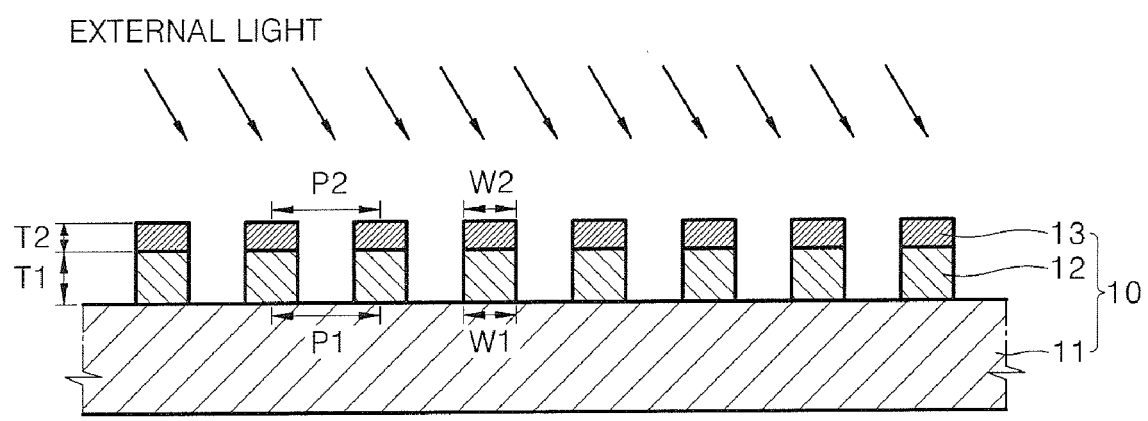
FIG. 2 is a cross-sectional view of the polarizer taken along line II-II of FIG. 1.

FIG. 1 is a schematic perspective view of a polarizer according to an embodiment of the present invention, and FIG. 2 is a cross-sectional view of the polarizer taken along line II-II of FIG. 1. Referring to FIGS. 1 and 2, the polarizer 10 includes a base 11, a grid 12, and low-reflective members 13. The grid 12 and the low-reflective members 13 are formed on the base 11.

The base 11 may be formed of a transparent material so that a light emitted from a display apparatus in which the polarizer 10 is disposed can transmit through the base 11. The base 11 may be formed of a glass or a flexible plastic material, and may be formed of a material including plastic to be formed as a film.

The grid 12 is formed on the base 11 in order to polarize certain wavelengths of light in electromagnetic waves. The grid 12 comprises a plurality of parallel conductive wires. The conductive material forming the parallel conductive wires of the grid 12 may be a metal such as, for example, aluminum, silver, chrome, nickel, cobalt, or molybdenum. The grid 12 has a period P1, wherein P1 represents the distance between the centers of the parallel conductive wires of the grid 12. The period P1 is an important consideration in determining the performance of the polarizer 10. If the period P1 between the parallel conductive wires of the grid 12, is longer than a wavelength of an incident light, the polarizer 10 mainly performs as a grating rather than as a polarizer. On the other hand, if the period P1 between the parallel conductive wires of the grid 12 is shorter than the wavelength of the incident light, the grid 12 mainly performs as a polarizer.

The polarizer 10 of the current embodiment includes the low-reflective members 13. Referring to FIGS. 1 and 2, the low-reflective members 13 are formed on the grid 13. The thickness T2 of the low-reflective members 13 may be different from the thickness T1 of the parallel conductive wires of the grid 12. The low-reflective members 13 may be formed in the same pattern as that of the grid 12 so that a period P2 of the low-reflective members 13 can be equal to the period P1 of the grid 12. As used herein, the term "grid" refers collectively to the plurality of parallel conductive wires, The low-reflective members 13 are formed of a material having a low reflectivity. As non-limiting examples, the low-reflective members 13 may be formed of CdSe, CdTe, or ruthenium. When the above materials are used to form the low-reflective members 13, the reflectivity is reduced and a polarization characteristic can be improved. This is described in more detail in following Tables 1 and 2. To obtain results of Tables 1 and 2, the polarizer 10 having the structure shown in FIG. 1 was fabricated, and experiments were performed. The period P1 of the grid 12 was set as 100 nm, the width W1 of the grid 12 was set as 50 nm, and the thickness T1 of the grid 12 was set as 100 nm. In addition, the period P2 of the low-reflective members 13 was set as 100 nm, a width W2 of the low-reflective members 13 was set as 50 nm, and the thickness T2 of the low-reflective members 13 was set as 100 nm.

TABLE 1

| | Reflectivity (%) | | | |
| --- | --- | --- | --- | --- |
| | Al | CdSe | CdTe | Ruthenium |
| Blue | 54 | 18 | 16 | 27 |
| Green | 54 | 19 | 27 | 26 |
| Red | 55 | 26 | 26 | 24 |

Table 1 shows the reflectivity of visible rays using polarizers 10 that include low-reflective members formed of CdSe, CdTe, or ruthenium, and, as a comparative example, using a polarizer having a grid formed of aluminum and not including low-reflective members.

Referring to table 1, when the polarizer was formed with an aluminum grid without low-reflective members, the reflectivity of blue, green, and red visible rays was 50% or more. However, when low-reflective members 13 were included in the polarizer 10 according to the current embodiment, the reflectivity of the visible spectrum was reduced to half of that of the aluminum. As shown in Table 1, CdSe, CdTe, and ruthenium all show a reflectivity of 30% or lower with respect to all wavelength bands of the visible spectrum.

TABLE 2

| | Polarization extinction ratio | | | |
| --- | --- | --- | --- | --- |
| | Al | CdSe | CdTe | Ruthenium |
| Blue | 1.60E+03 | 3.67E+03 | 3.99E+03 | 3.91E+06 |
| Green | 1.90E+03 | 4.08E+03 | 3.55E+03 | 5.13E+06 |
| red | 2.97E+03 | 4.26E+03 | 4.93E+03 | 7.20E+06 |

Table 2 shows polarization extinction ratios using the polarizers 10 described above.

Referring to Table 2, the polarization extinction ratio of polarizers 10 that include low-reflective members formed of CdSe, CdTe, or ruthenium was superior to that of the polarizer having a grid formed of aluminum and not including low-reflective members. The term "polarization extinction ratio" refers to a ratio between optical powers of an incident S wave and a transmitting S wave when S polarized light is incident. The higher the polarization extinction ratio is, the superior the polarization performance is.

As shown in Table 2, polarizers 10 including CdSe and CdTe low-reflective members were found to have polarization extinction ratios that were more than twice of that of the polarizer having a grid formed of aluminum and not including low-reflective members. The polarizers 10 including ruthenium low-reflective members was found to have a polarization extinction ratio that is over 1000 times of that of the aluminum polarizer having a grid formed of aluminum and not including low-reflective members.

The low-reflective members 13 can include a dielectric material. The low-reflective members 13 can be formed of various dielectric materials including organic materials or inorganic materials. When the low-reflective member 13 is formed of an inorganic material, materials such as SiOx ($x \geq 1$), SiNx($x \geq 1$), $MgF_2$, $CaF_2$, $Al_2O_3$, $SnO_2$, ITO (indium tin oxide), IZO (indium zinc oxide), ZnO, $In_2O_3$, $Cr_2O_3$, $Ag_2O$, $TiO_2$, $Ta_2O_5$, $HfO_2$, or nitride materials can be used.

When the low-reflective members 13 are formed of an organic material, materials such as polyethylene (PE), polypropylene (PP), polystyrene (PS), polyethylene terephthalate (PET or PETE), polyamide (PA), polyester, polyvinyl chloride (PVC), polycarbonate (PC), acrylonitrile butadiene styrene (ABS), polyvinylidene chloride (PVDC), polytetrafluoroethylene (PTFE), polymethyl methacrylate (PMMA), polylactic acid (PLA), or polyurethane (PU) can be used. In addition, a low-polymer organic material such as CuPc (copper phthalocyanine), N,N'-Di(naphthalene-1-yl)-N,N'-diphenyl-benzidine (NPB), and tris-8-hydroxyquinoline aluminum (Alq3) can be used.

In addition, the low-reflective members 13 may include a metal material so that the metal and the organic material can be combined. That is, the metal and the dielectric material may be codeposited to form a mixture, and thus, to form low-reflective members having a low reflectivity and a high absorption coefficient. As non-limiting examples, the metal material can be Fe, Co, V, Ti, Al, Ag, Si, Cr, Mo, Ge, Y, Zn, Zr, W, Ta, Cu, or Pt. The dielectric material forming the mixture with the metal can be an organic material, an inorganic material, or a compound of the organic and inorganic materials. The inorganic material that forms the mixture with the metal can be the a material such as $SiO_x$($x \geq 1$), $SiN_x$($x \geq 1$), $MgF_2$, $CaF_2$, $Al_2O_3$, $SnO_2$, ITO (indium tin oxide), IZO (indium zinc oxide), ZnO, $In_2O_3$, $Cr_2O_3$, $Ag_2O$, $TiO_2$, $Ta_2O_5$, $HfO_2$, or nitride materials.

As non-limiting examples, the organic material forming the mixture with the metal can be a polymer material such as polyethylene (PE), polypropylene (PP), polystyrene (PS), polyethylene terephthalate (PET or PETE), polyamide (PA), polyester, polyvinyl chloride (PVC), polycarbonate (PC), acrylonitrile butadiene styrene (ABS), polyvinylidene chloride (PVDC), polytetrafluoroethylene (PTFE), polymethyl methacrylate (PMMA), polylactic acid (PLA), or polyurethane (PU). In addition, a low-polymer organic material such as CuPc (copper phthalocyanine), N,N'-Di(naphthalene-1-yl)-N,N'-diphenyl-benzidine (NPB), and tris-8-hydroxyquinoline aluminum (Alq3) can be used. The low-reflective members 13 can be formed by mixing the compound of the above organic and inorganic materials with the metal.

The low-reflective members 13 are formed on the grid 12 to cover the upper surfaces of the grid 12. That is, when the external light is incident onto a surface of the base 11, on which the grid 12 is formed, the low-reflective members 13 in the polarizer 10 prevent the external light from being reflected by the grid 12. To obtain the above effect, the width W2 of the low-reflective member 13 can be the same as the width W1 of the grid 12. To form the polarizer 10, a conductive material for forming the grid 12 is applied on the base 11, the material forming the low-reflective members 13 is applied on the conductive material, and then, a patterning process is performed using a mask to form the structure shown in FIGS. 1 and 2.

Figure 3:
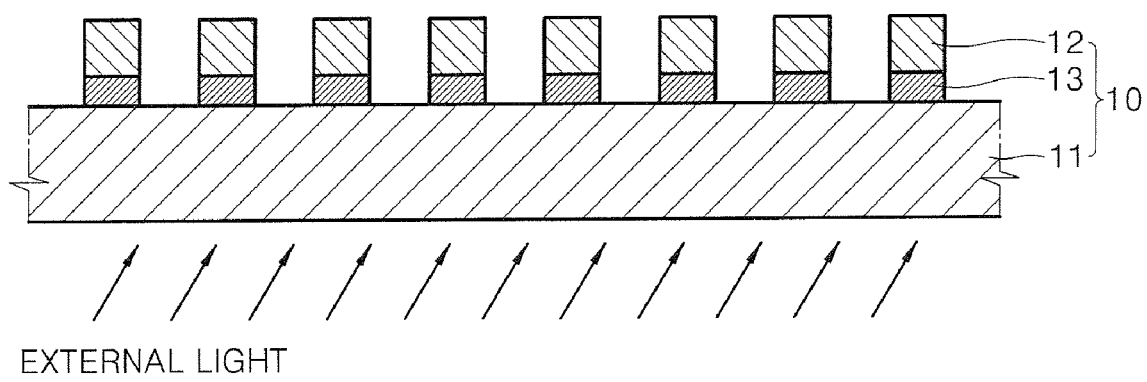
FIG. 3 is a schematic cross-sectional view of a polarizer according to another embodiment of the present invention.

FIG. 3 shows a structure of a polarizer 10 according to another embodiment of the present invention. In the polarizer 10 according to FIG. 3, the low-reflective members 13 are located between the base 11 and the grid 12. Therefore, when the external light is directed into the polarizer 10 toward a surface of the base 11 the low-reflective members 13 formed on the base 11 prevent the external light from being reflected by bottom surface of the grid 12.

The polarizer according to aspects of the present invention may be used in flat panel display apparatuses such as organic light emitting display apparatuses, liquid crystal display apparatuses, and projection display apparatuses. Hereinafter, the organic light emitting display apparatus including the polarizer according to aspects of the present invention will be described with reference to FIGS. 4 through 23. In the organic light emitting display apparatus, the base 11 is not required, and a linear polarizing layer 22 including the grid 12 comprising parallel conductive wires and the low-reflective members 13 can directly formed on a substrate 20 or a sealing member 50 of the organic light emitting display apparatus. The grid 12 and the low-reflective members 13 of the linear polarizing layer 22 are the same as those of the polarizer 10, and thus, detailed structures, materials, and forming methods of the grid 12 and the low-reflective members 13 are omitted here.

As described in more detail below, FIGS. 4 through 9 and 20 through 21 relate to bottom emission organic light emitting display apparatuses and FIGS. 10 through 19 and 22 through 23 relate to front emission organic light emitting display apparatuses. In a bottom emission organic light emitting display apparatus, light generated by a light emitting device 30 passes through a substrate 20 on which the light emitting device 30 is formed. A user of the bottom emission organic light emitting display apparatus views images formed by light that exits the through an external portion of the bottom emission organic light emitting display apparatus. As used with respect to bottom emission organic light emitting display apparatuses, the term "external portion" refers to the surface of the bottom emission organic light emitting display apparatus through which light exits to the outside and that is exposed to external light. The term "lower" refers to a direction that light generated by the light emitting device 30 travels toward the external portion. In a front emission organic light emitting display apparatus, on the other hand, light generated by a light emitting device 30 passes through a sealing member 50. A user of the front emission organic light emitting display apparatus views images formed by light that exits the external portion of the front emission organic light emitting display apparatus. As used with respect to front emission organic light emitting display apparatuses, the term "external portion" refers to the surface of the front emission organic light emitting display apparatus through which light exits to the outside and that is exposed to external light. The term "upper" refers to a direction that light generated by the light emitting device 30 travels toward the external portion.

Moreover, it is to be understood that where is stated herein that one layer is "formed on" or "disposed on" a second layer, the first layer may be formed or disposed directly on the second layer or there may be an intervening layer between the first layer or the second layer. Further, as used herein, the term "formed on" is used with the same meaning as "located on" or "disposed on" and is not meant to be limiting regarding any particular fabrication process.

Figure 4:
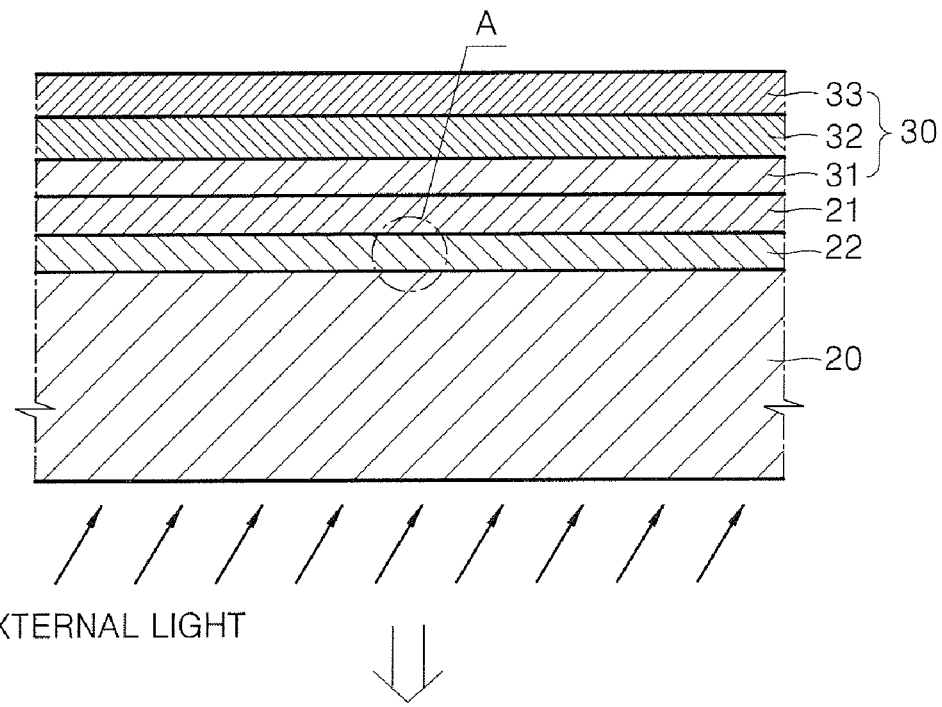
FIGS. 4 and 5 are a schematic cross-sectional view showing a bottom emission organic light emitting display apparatus according to an embodiment of the present invention and an enlarged view of a linear polarizing layer of the bottom emission organic light emitting display apparatus, respectively.

FIG. 4 is a cross-sectional view of an organic light emitting display apparatus according to an embodiment of the present invention. As shown in FIG. 4, the organic light emitting display apparatus includes a substrate 20 formed of a transparent material, the linear polarizing layer 22, a quarter-wave retardation layer 21, an organic light emitting device 30, and a sealing member (not shown), which are sequentially formed on the substrate 20.

The substrate 20 may be formed of a transparent material such as $SiO_2$ or transparent plastic. Although it is not shown in the drawings, a buffer layer (not shown) can be further formed on the substrate 20 in order to improve the smoothness of the substrate 20 and to prevent impurities from infiltrating. As a non-limiting example, the buffer layer can be formed of $SiO_2$ and/or $SiN_x$.

Figure 5:
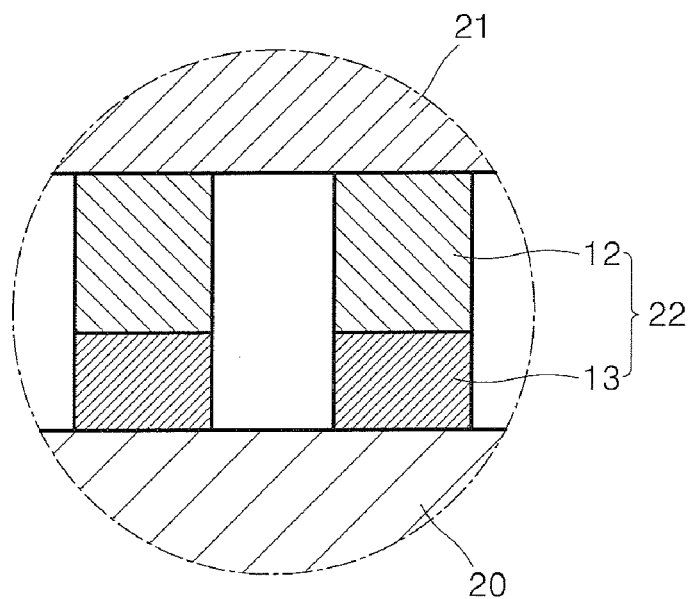

The linear polarizing layer 22 is formed on the upper surface of the substrate 20. FIG. 5 shows an enlarged view of part A in FIG. 4, and the structure of the linear polarizing layer 22 is shown in detail. The low-reflective members 13 are located to be closer to the direction from which the external light is incident than is the grid 12. As shown in FIG. 4, the external light is incident onto the substrate 20, and the low-reflective members 13 are formed on the substrate, and the grid 12 is formed on the low-reflective member 13. The materials, structures, and forming methods of the low-reflective members 13 and the grid 12 are the same as those of the previous embodiment.

The quarter-wave retardation layer 21 is formed on the linear polarizing layer 22. An organic light emitting device 30 is formed on the quarter-wave retardation layer 21. The linear polarizing layer 22 is disposed on the portion from which the external light is incident, and then, the quarter-wave retardation layer 21 is disposed on the linear polarizing layer 22. An additional light transmitting member can be disposed between the linear polarizing layer 22 and the quarter-wave retardation layer 21.

The organic light emitting device 30 includes a first electrode and a second electrode 33 facing each other, and an organic light emitting layer 32. The first electrode 31 can be formed of a transparent conductive material, such as, for example, ITO, IZO, $In_2O_3$ or ZnO, in a predetermined pattern using a photolithography method. The first electrode 31 can be formed as stripes that are separated from each other in a passive matrix type (PM) display apparatus, or can be formed to correspond to pixels in an active matrix type (AM) display apparatus. The second electrode 33 is disposed on the first electrode 31. The second electrode 33 can be a reflective electrode formed of aluminum, silver, and/or calcium and can perform as a cathode by being connected to an external terminal (not shown). The second electrode 33 can be formed as stripes crossing the pattern of the first electrode 31 in the PM type display apparatus, or can be formed on an entire active area displaying images in the AM type display apparatus. Polarities of the first electrode 31 and the second electrode 33 can be opposite to each other.

The organic light emitting layer 32 disposed between the first electrode 31 and the second electrode 33 emits light by the electric interactions of the first and second electrodes 31 and 33. The organic light emitting layer 32 can be formed using a low-polymer organic material or a polymer organic material. If the organic light emitting layer 32 is formed of the low-polymer organic material, a hole transport layer and a hole injection layer are stacked on the first electrode 31 and an electron transport layer and an electron injection layer are stacked on the second electrode 33. Various other layers can be stacked if necessary. As non-limiting examples, the organic material can be CuPc (copper phthalocyanine), N'-Di (naphthalene-1-yl)-N,N'-diphenyl-benzidine (NPB), or tris-8-hydroxyquinoline aluminum (Alq3).

On the other hand, if the organic light emitting layer is formed of the polymer organic material, only a hole transport layer (HTL) needs to be formed on the first electrode 31. The HTL can be formed on the first electrode 31 using PEDOT (poly-(2,4)-ethylene-dihydroxy thiophene) or PANI (polyaniline) in an inkjet printing method or a spin coating method. The polymer organic light emitting layer 32 can be formed of PPV, soluble PPV's, cyano-PPV, or polyfluorene using an inkjet printing or spin coating method, or a thermal transfer method using a laser to form color patterns.

The light emitted from the organic light emitting device 30 is emitted through the substrate 20 as shown in FIG. 4, and a user can see the images from an external portion of the lower surface of the substrate 20. In the bottom emission structure as above, the external light such as the sunlight can be incident through the substrate 20, and may degrade the contrast.

However, according to the current embodiment, the linear polarizing layer 22 and the quarter-wave retardation layer 21 form a circular polarizing layer to minimize the reflection of the external light. In the external light incident from the lower external portion of the substrate 20, components of light in a direction of an absorbing axis of the linear polarizing layer 22 are absorbed and components in a direction of a transmitting axis are transmitted. The components in the direction of the transmitting axis are circularly polarized while passing through the quarter-wave retardation layer 21. The circularly polarized light is reflected by the second electrode 33 of the organic light emitting device 30. When the circularly polarized light rotating in a particular direction is reflected, the circularly polarized light rotates in the opposite direction, and then is linearly polarized in a direction crossing the transmitting axis when the circularly polarized light transmits through the quarter-wave retardation layer 21. The linearly polarized light is absorbed by the linear polarizing layer 22, and the light cannot exit the substrate 20. Therefore, the reflection of the external light can be minimized, and the contrast can be improved.

The linearly polarizing layer 22 of the current embodiment includes the grid 12 and the low-reflective members 13, which are closer to the portion through which the external light is incident, than is the grid 12. Therefore, when external light passing through the substrate 20 reaches the linear polarizing layer 22, the low-reflective members 13 can reduce the reflection of the external light by the grid 12, which is formed of the metal material, and consequently, the contrast improvement can be reinforced.

In addition, since the linear polarizing layer 22 and the quarter-wave retardation layer 21 are directly formed on the substrate 20, an additional adhesive layer is not required, and thus, the organic light emitting display apparatus with a reduced thickness can be fabricated. In addition, the images emitted from the light emitting layer are not required to travel through an adhesive layer, and thus, the brightness of the display apparatus can be improved.

The linear polarizing layer 22 and the quarter-wave retardation layer 21 can be formed in various ways. In addition, the above structure can be modified in a front emission type display apparatus in consideration of the incident direction of the external light.

Figure 6:
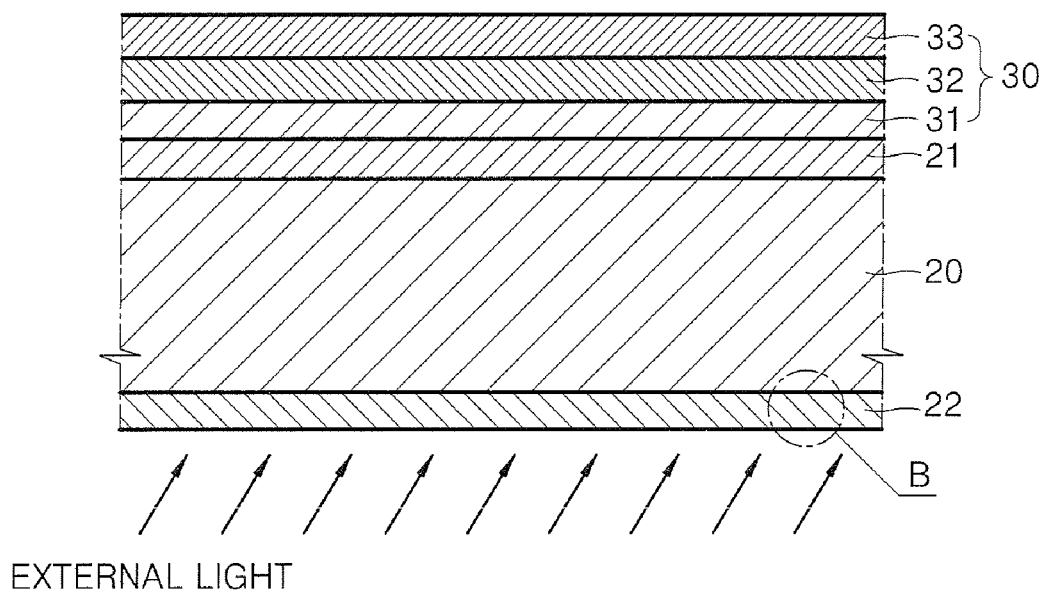
FIGS. 6 and 7 are a schematic cross-sectional view showing a bottom emission organic light emitting display apparatus according to another embodiment of the present invention and an enlarged view of a linear polarizing layer of the bottom emission organic light emitting display apparatus, respectively.
Figure 7:
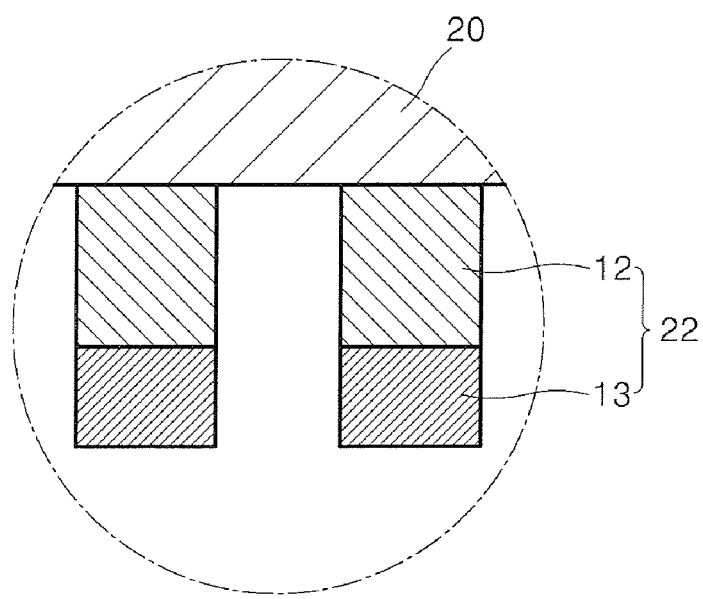

FIG. 6 is a cross-sectional view of a bottom emission organic light emitting display apparatus according to another embodiment of the present invention. The linear polarizing layer 22 is formed on a surface of the substrate 20, which faces the external portion, and the quarter-wave retardation layer 21 is formed on the other surface of the substrate 20. The organic light emitting device 30 is formed on the quarter-wave retardation layer 21. A detailed structure of the linear polarizing layer 22 is shown in FIG. 7, which is an enlargement of part B in FIG. 6. The low-reflective members 13 are formed on the portion facing the incident direction of the external light, and the grid 12 is formed on the low-reflective members 13. The components are the same as those of the previous embodiment, and thus, detailed descriptions for the components are omitted. In the current embodiment, when the external light incident from the external portion of the substrate 20 passes through the linear polarizing layer 22, the external light is linearly polarized, and when the external light passes through the quarter-wave retardation layer 21 after passing through the substrate 20, the light is circularly polarized light that rotates in a particular direction. Then, when the circularly polarized light is reflected by the second electrode 33, the light is circularly polarized to rotate in the opposite direction. The circularly polarized light rotating in the opposite direction passes through the quarter-wave retardation layer 21, and then the light is linearly polarized in a direction crossing the transmitting axis. In addition, the linearly polarized light cannot pass through the linear polarizing layer 22, and thus, the light does not exit the substrate 20. Therefore, the reflection of the external light is reduced, and the contrast is improved.

Moreover, the linear polarizing layer 22 includes the low-reflective members 13 that prevent the external light incident onto the lower surface of the substrate 20 from being reflected by the grid 12, and thus, the improvement of the contrast can be reinforced.

Figure 8:
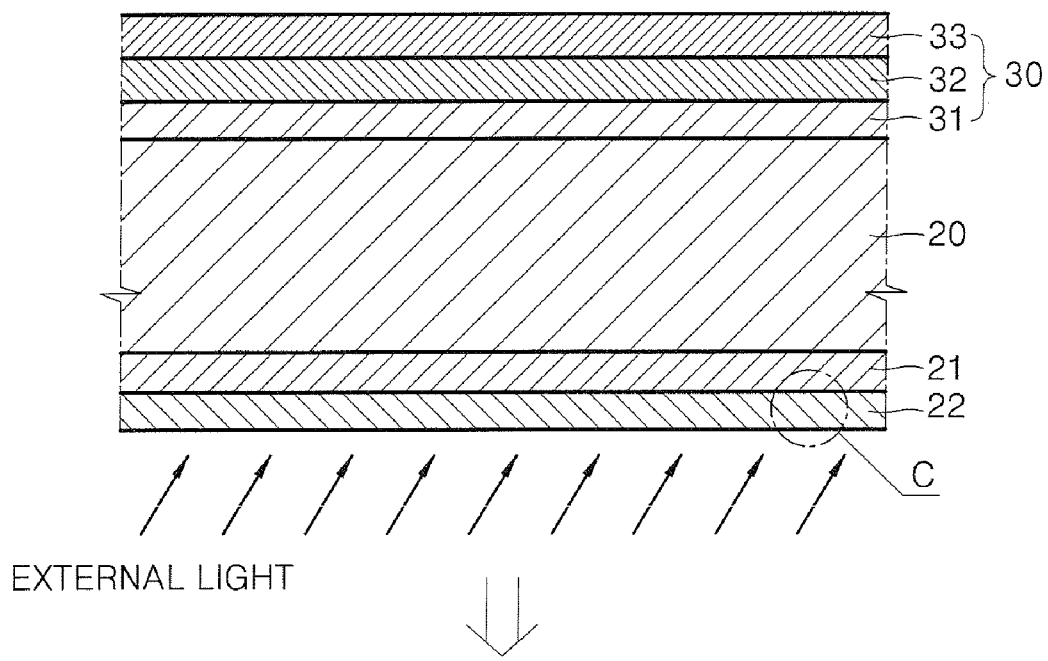
FIGS. 8 and 9 are a schematic cross-sectional view showing a bottom emission organic light emitting display apparatus according to another embodiment of the present invention and an enlarged view of a linear polarizing layer of the bottom emission organic light emitting display apparatus, respectively.

FIG. 8 is a cross-sectional view of a bottom emission organic light emitting display apparatus according to another embodiment of the present invention. The quarter-wave retardation layer 21 and the linear polarizing layer 22 are sequentially formed on a surface of the substrate 20 that faces the external portion of the bottom emission organic light emitting display apparatus, and the organic light emitting device 30 is formed on the other surface of the substrate 20. The components are the same as those of the previous embodiment.

Figure 9:
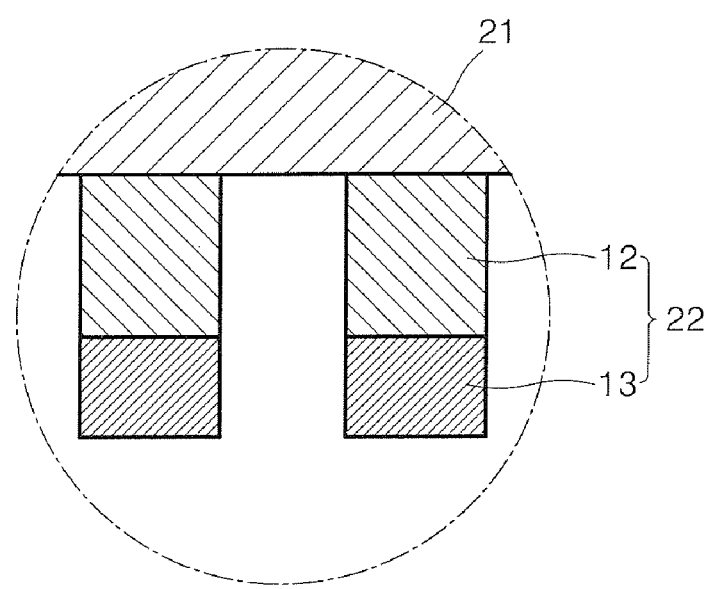

A detailed structure of the linear polarizing layer 22 is shown in FIG. 9, which is an enlarged view of part C in FIG. 8. The grid 12 is formed on a lower surface of the quarter-wave retardation layer 21, and the low-reflective members 13 are formed on the lower surfaces of the grid 12.

In the current embodiment, the low-reflective members 13 can minimize the reflection of the external light by the grid 12, and thus, the contrast can be improved.

The above description relates to bottom emission organic light emitting display apparatuses, which display images on a portion where the substrate 20 exists. However, the present invention is not limited thereto. Aspects of the present invention can also be applied to front emission organic light emitting display apparatus, which displays images on a portion opposite to the substrate 20.

Figure 10:
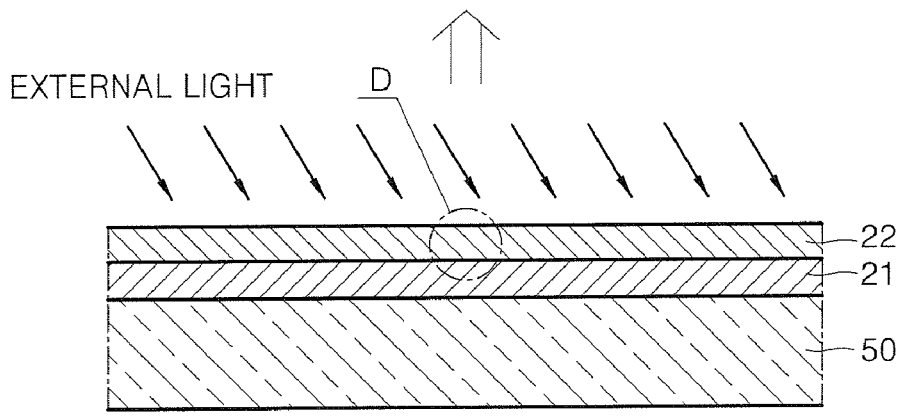
FIGS. 10 and 11 are a schematic cross-sectional view showing a front emission organic light emitting display apparatus according to another embodiment of the present invention and an enlarged view of a linear polarizing layer of the front emission organic light emitting display apparatus, respectively.

FIG. 10 is a cross-sectional view of a front emission organic light emitting display apparatus according to another embodiment of the present invention. The organic light emitting display apparatus includes a substrate 20, a reflective layer 34 on the substrate 20, an organic light emitting device 30, and a sealing member 50.

As described above, the substrate 20 can be a transparent glass substrate, but is not limited thereto. As other examples, the substrate 20 can be formed of a plastic material to be flexible or a metal material. If the substrate 20 is formed of a metal material, an insulating layer is further formed on a surface of the metal.

The reflective layer 34 formed on a surface of the substrate 20 can be formed of Ag, the reflective layer 34 using ITO, IZO, ZnO, or $In_2O_3$ having a high work function if the first electrode 31 is intended to perform as an anode. If the first electrode 31 is intended to perform as a cathode, the first electrode 31 can be formed of Ag, Mg, Al, Pt, Pd, Au, Ni, Nd, Ir, Cr, or a compound thereof and can also serve as the reflective layer. Hereinafter, it is assumed that the first electrode 31 performs as the anode.

A second electrode 33 is formed as a transmissive electrode. The second electrode 33 can be formed as a thin semi-transmissive layer using a metal material such as Li, Ca, LiF/Al, Al, Mg, or Ag having a low work function. A transparent conductive material such as ITO, IZO, ZnO, or $In_2O_3$ can be formed on the metal semi-transmissive layer to solve a high-resistance problem caused by the thin thickness.

The organic light emitting layer 32 disposed between the first electrode 31 and the second electrode 33 may be the same as that of the previous embodiments.

The sealing member 50 for sealing the organic light emitting device 30 is formed on the organic light emitting device 30. The sealing member 50 is formed to protect the organic light emitting device 30 from the external moisture or oxygen, and is formed of a transparent material. Therefore, the sealing member 50 can be formed of glass, plastic, or multiple layers of organic materials and inorganic materials. As shown in FIGS. 10, 12, 14 and 23, the sealing member 50 may be spaced apart from the organic light emitting device 30. For example, the sealing member may be supported on the periphery of the organic light emitting device 30.

Figure 11:
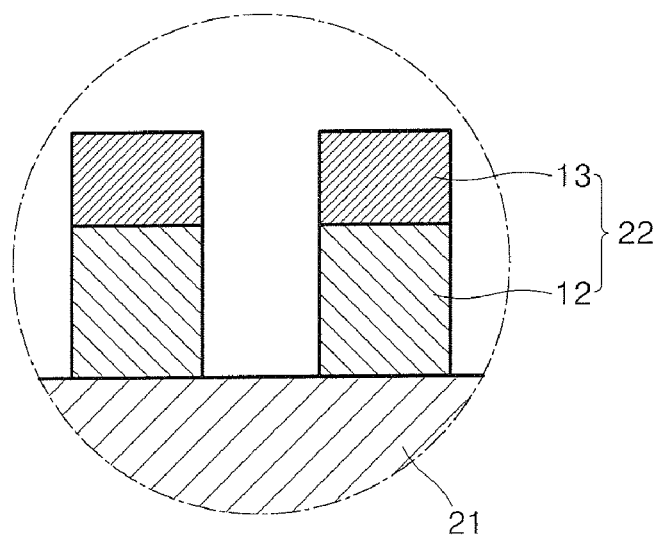

A quarter-wave retardation layer 21 and a linear polarizing layer 22 are sequentially formed on an upper surface of the sealing member 50, that is, a surface facing the external portion. The structure of the linear polarizing layer 22 is shown in FIG. 11, which is an enlarged view of part D of FIG. 10. The grid 12 is formed on the sealing member 50, and the low-reflective members 13 are formed on the grid 12. The structures of the grid 12 and the low-reflective members 13 of FIG. 11 are the same as those of FIG. 1, and thus, detailed descriptions for those are omitted.

According to the current embodiment, the external light incident from the direction opposite to the direction that light travels from the organic light emitting device 30 in displaying images, that is, from an upper portion of FIG. 10, transmits through the linear polarizing layer 22 and the quarter-wave retardation layer 21. When the external light is reflected by the reflective layer 34, the reflected light cannot pass through the linear polarizing layer 22 for the reasons described above.

In addition, as shown in FIG. 11, the low-reflective member 13 is formed on the grid 12, and thus, the low-reflective member 13 prevents the external light from being reflected by the grid 12 when the external light is incident from the upper portion. Thereby, the contrast of the front emission organic light emitting display apparatus is improved.

Figure 12:
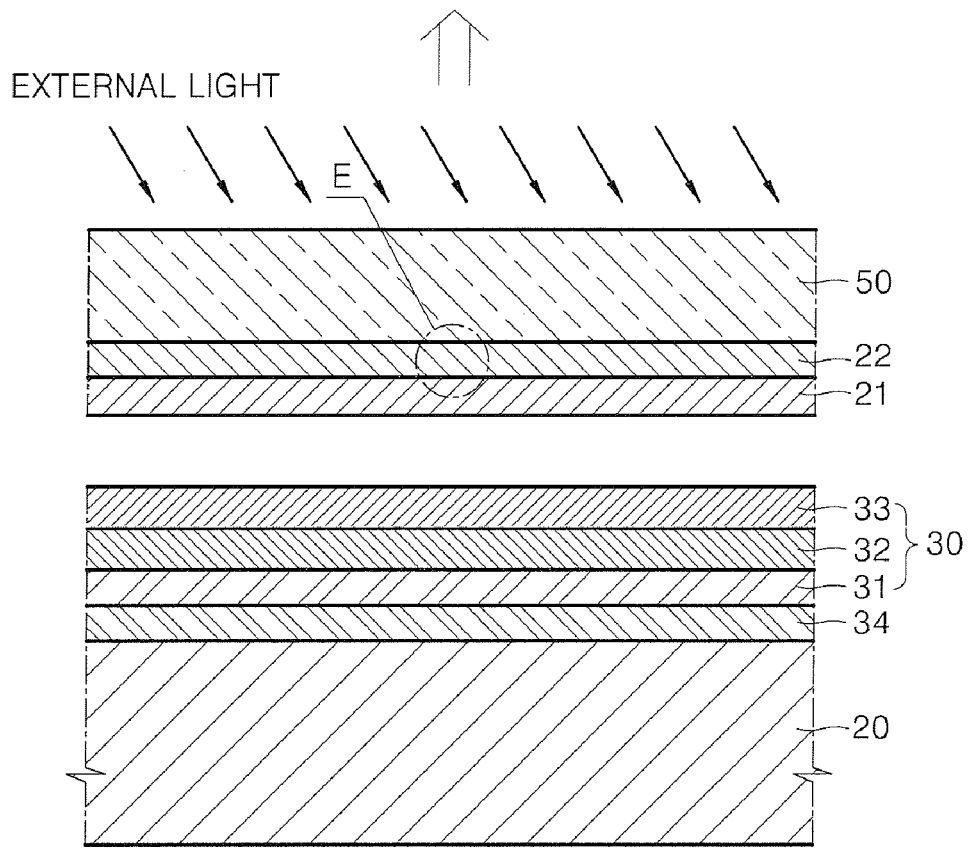
FIGS. 12 and 13 are a schematic cross-sectional view showing a front emission organic light emitting display apparatus according to another embodiment of the present invention and an enlarged view of a linear polarizing layer of the front emission organic light emitting display apparatus, respectively.
Figure 13:
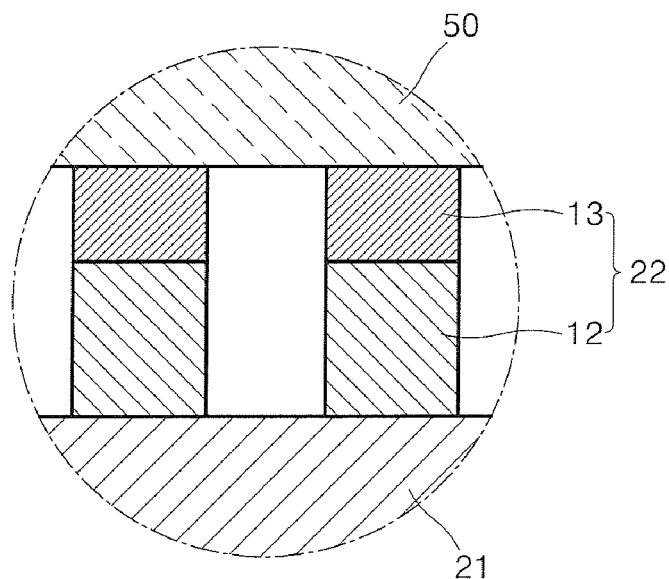

FIG. 12 is a cross-sectional view of a front emission organic light emitting display apparatus according to another embodiment of the present invention. The linear polarizing layer 22 and the quarter-wave retardation layer 21 are sequentially formed on a surface of the sealing member 50 that faces the organic light emitting device 30. The structure of the linear polarizing layer 22 is shown in FIG. 13, which is an enlarged view of part E of FIG. 12. The low-reflective members 13 are formed on a lower surface of the sealing member 50, and the grid 12 is formed on the lower surfaces of the low-reflective members 13. Details regarding the structures and effects of the display apparatus are the same as those of the previous embodiment.

Figure 14:
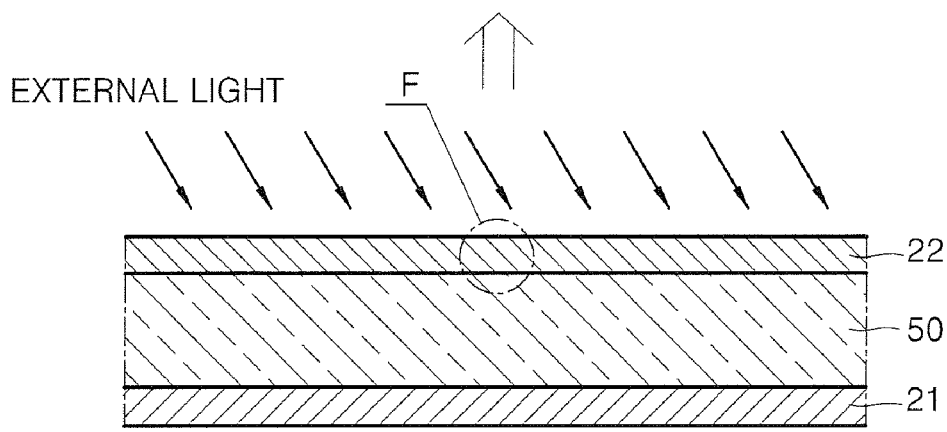
FIGS. 14 and 15 are a schematic cross-sectional view showing a front emission organic light emitting display apparatus according to another embodiment of the present invention and an enlarged view of a linear polarizing layer of the front emission organic light emitting display apparatus, respectively.
Figure 15:
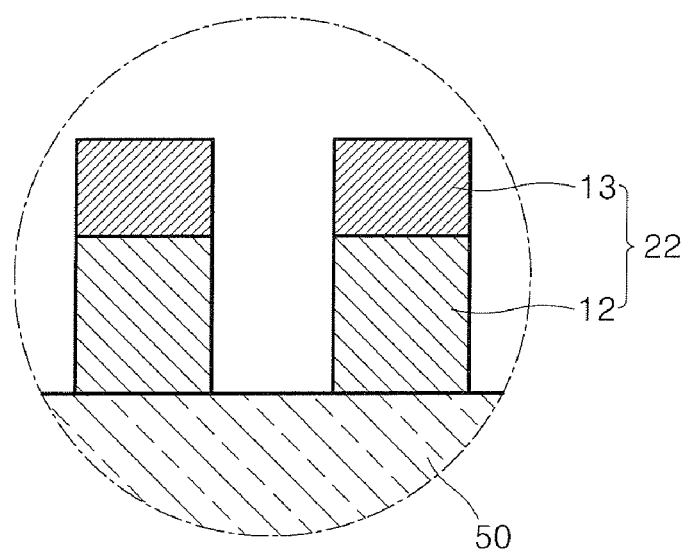

FIG. 14 is a cross-sectional view of a front emission organic light emitting display apparatus according to another embodiment of the present invention. The linear polarizing layer 22 is formed on a surface of the sealing member 50 that faces the external portion, and the quarter-wave retardation layer 21 is formed on the other surface of the sealing member 50, that is, the surface that faces the organic light emitting device 30. The structure of the linear polarizing layer 22 is shown in FIG. 15, which is an enlarged view of part F of FIG. 14. The grid 12 is formed on the upper surface of the sealing member 50, and the low-reflective members 13 are formed on the grid 12. Details regarding the structures and effects of the display apparatus are the same as those of the previous embodiment.

Figure 16:
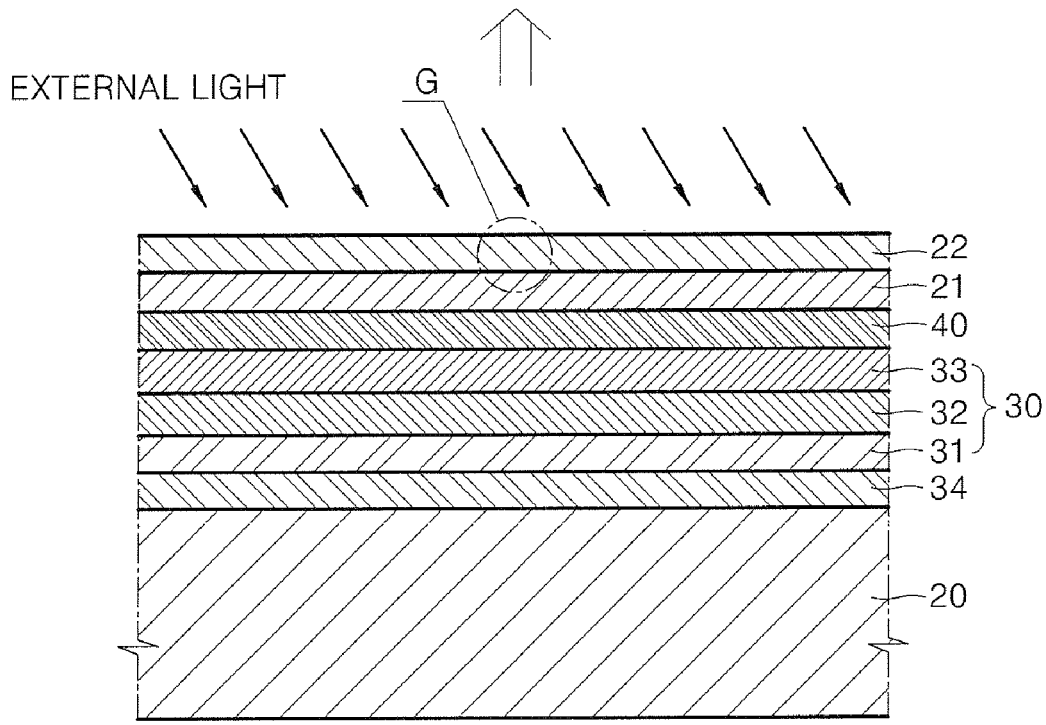
FIGS. 16 and 17 are a schematic cross-sectional view showing a front emission organic light emitting display apparatus according to another embodiment of the present invention and an enlarged view of a linear polarizing layer of the front emission organic light emitting display apparatus, respectively.
Figure 17:
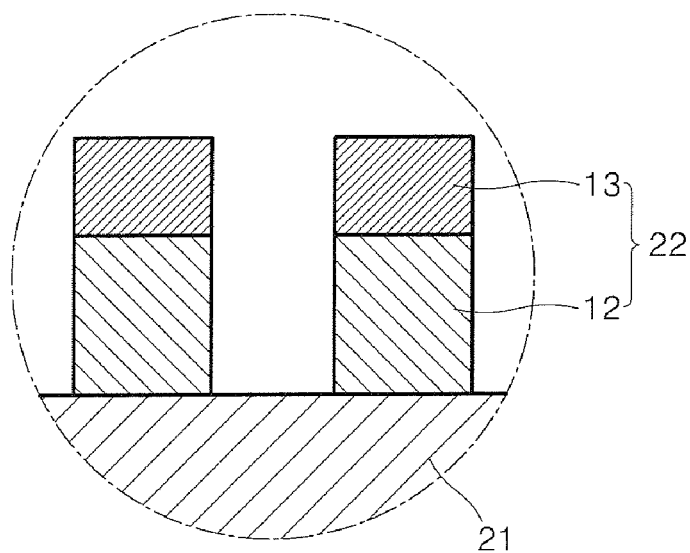

FIG. 16 is a cross-sectional view of a front emission organic light emitting display apparatus according to another embodiment of the present invention. The reflective layer 34 is formed on the substrate 20, the organic light emitting device 30 is formed on the reflective layer 34, the quarter-wave retardation layer 21 is formed on the organic light emitting device 30, and the linear polarizing layer 22 is formed on the quarter-wave retardation layer 21. The structure of the linear polarizing layer 22 is shown in FIG. 17, which is an enlarged view of part G of FIG. 16. The grid 12 is formed on the quarter-wave retardation layer 21, and the low-reflective members 13 are formed on the grid 12. Here, a protective layer 40 may be formed between the second electrode 33 and the quarter-wave retardation layer 21 to prevent the second electrode 33 from being damaged when the quarter-wave retardation layer 21 is formed.

The protective layer 40 may be formed of an inorganic material or an organic material. As non-limiting examples, the inorganic material can be a metal oxide, a metal nitride, a metal carbide, a metal oxynitride, and a compound thereof. The metal oxide can be a silicon oxide, an aluminum oxide, a titanium oxide, an indium oxide, a tin oxide, and a compound thereof. The metal nitride can be an aluminum nitride, a silicon nitride, and a compound thereof. The metal carbide can be a silicon carbide, and the metal oxynitride can be a silicon oxynitride. Also, the inorganic material may be a silicon material such as, for example a ceramic dielectric of silicon and a metal. Moreover, a DLC (diamond-like carbon) can be used.

The protective layer 40 may also be an organic polymer, an inorganic polymer, an organometallic polymer, or a hybrid organic/inorganic polymer, or can be an acryl resin.

Figure 18:
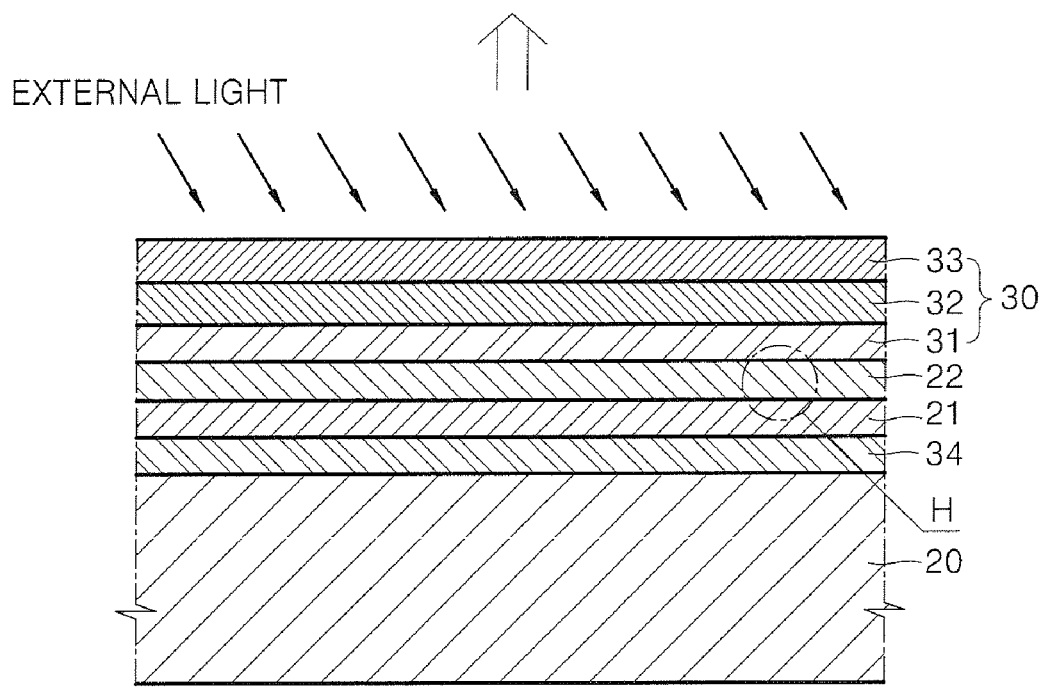
FIGS. 18 and 19 are a schematic cross-sectional view showing a front emission organic light emitting display apparatus according to another embodiment of the present invention and an enlarged view of a linear polarizing layer of the front emission organic light emitting display apparatus, respectively.
Figure 19:
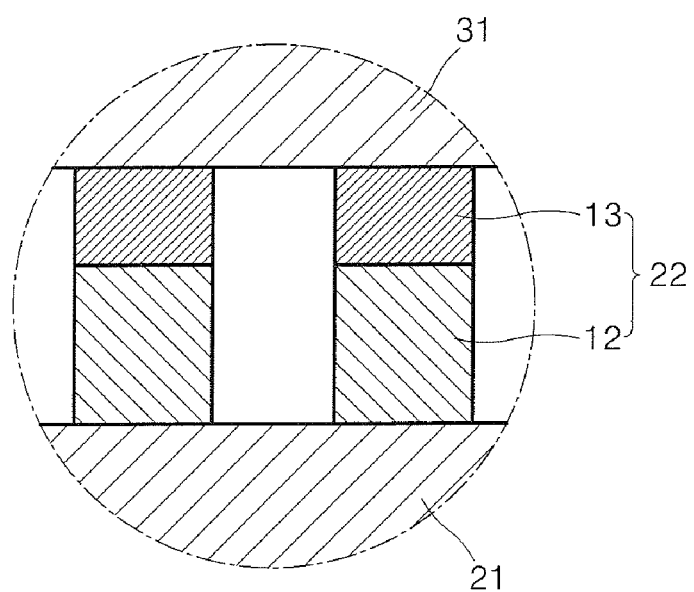

FIG. 18 is a cross-sectional view of a front emission organic light emitting display apparatus according to another embodiment of the present invention. The quarter-wave retardation layer 21 and the linear polarizing layer 22 are formed between the reflective layer 34 and the organic light emitting device 30. The structure of the linear polarizing layer 22 is shown in FIG. 19, which is an enlarged view of part H of FIG. 18. The grid 12 is formed on the quarter-wave retardation layer 21, and the low-reflective members 13 are formed on the grid 12. In this case, the external light incident on the external portion of the front emission organic light emitting display apparatus (shown in FIG. 18 as light coming from from the upper portion of the drawing) is linearly polarized in a direction that is parallel to the transmitting axis while passing through the linear polarizing layer 22, and then, is circularly polarized in one direction while passing through the quarter-wave retardation layer 21. Then, the light is reflected by the reflective layer 34, and is circularly polarized in the opposite direction. When the circularly polarized light passes through the quarter-wave retardation layer 21 again, the light is linearly polarized in a direction that crosses the transmitting axis, and the linearly polarized light cannot pass through the linear polarizing layer 22. Therefore, the user cannot see the reflected light from the external portion.

In addition, the reflection of the external light by the grid 12 can be minimized by the low-reflective members 13.

Although it is not shown in the drawing, the quarter-wave retardation layer 21 can be formed on the upper surface of the reflective layer 34, the organic light emitting device 30 can be formed on the quarter-wave retardation layer 21, and the linear polarizing layer 22 can be formed on the organic light emitting device 30.

Figure 20:
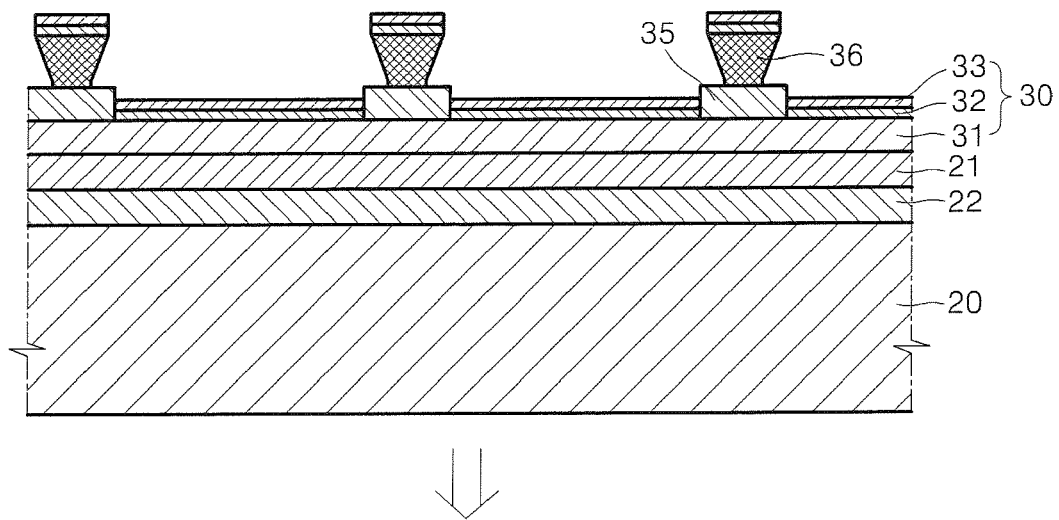
FIG. 20 is a schematic cross-sectional view of a passive matrix (PM) type bottom emission organic light emitting display apparatus according to another embodiment of the present invention.

FIG. 20 is a schematic cross-sectional view of a passive matrix (PM) type bottom emission organic light emitting display apparatus according to another embodiment of the present invention.

Like the apparatus of FIG. 5, the organic light emitting display apparatus of FIG. 20 includes the linear polarizing layer 22 and the quarter-wave retardation layer 21, which are sequentially formed on the upper surface of the substrate 20. The organic light emitting device 30 is formed on the quarter-wave retardation layer 21. The detailed structure of the linear polarizing layer 22 is the same as that of FIGS. 4 and 5, and thus, a description of the linear polarizing layer 22 is not repeated herein.

The first electrode 31 is formed on the quarter-wave retardation layer 21 in a predetermined stripe pattern, and an internal insulating layer 35 is formed on the first electrode 31 to define the stripes. In addition, a separator 36 that crosses the first electrode 31 at a right angle is formed on the internal insulating layer 35 in order to pattern the organic light emitting layer 32 and the second electrode 33. The organic light emitting layer 32 and the second electrode 33 are patterned by the separator 36 to cross the first electrode 31. A sealing member (not shown) is formed on the second electrode 33 to protect the organic light emitting device 30 from the external environment. If desired, the organic light emitting layer 32 and the second electrode 33 can be patterned without forming the separator 36.

According to the embodiment shown in FIG. 20, the external light incident from the lower portion of the substrate 20 is not reflected, and thus, the contrast of the bottom emission organic light emitting display apparatus can be improved and the thickness of the entire display apparatus can be reduced.

In addition, the reflection of the external light by the grid 12 can be minimized by using the low-reflective members 13, and thus, the improvement of the contrast can be reinforced.

Although it is not shown in the drawings, the structures shown in FIGS. 6 and 8 can be applied to the PM type display apparatus.

Figure 21:
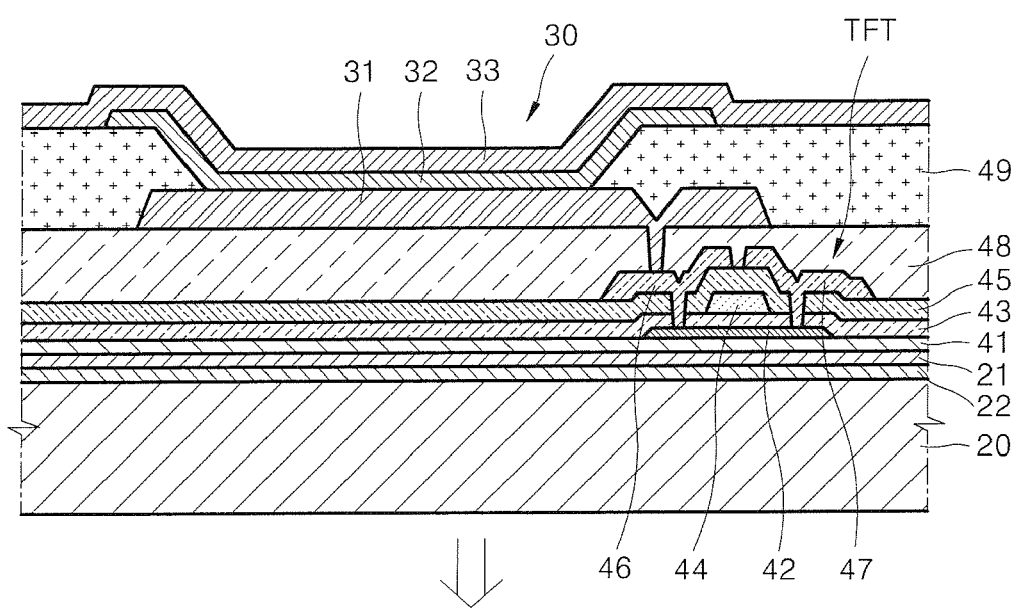
FIG. 21 is a schematic cross-sectional view of an active matrix (AM) type bottom emission organic light emitting display apparatus according to another embodiment of the present invention.

FIG. 21 is a schematic cross-sectional view of an AM type bottom emission organic light emitting apparatus according to another embodiment of the present invention.

Referring to FIG. 21, a thin film transistor (TFT) is formed on the upper surface of the substrate 20. At least one TFT is formed on each pixel, and is electrically connected to the organic light emitting device 30.

In more detail, the linear polarizing layer 22 and the quarter-wave retardation layer 21 are sequentially formed on the substrate 20. The detailed structure of the linear polarizing layer 22 is the same as that of FIG. 5, and thus, description for that is not repeated. A buffer layer 41 is formed on the quarter-wave retardation layer 21, and a semiconductor layer 42 is formed on the buffer layer 41 in a predetermined pattern. A gate insulating layer 43 formed of $SiO_2$ or SiNx is formed on the semiconductor layer 42, and a gate electrode 44 is formed on a predetermined region on the gate insulating layer 43. The gate electrode 44 is connected to a gate line (not shown) applying TFT ON/OFF signals. An interlayer dielectric 45 is formed on the gate electrode 44, and a source electrode 46 and a drain electrode 47 are respectively connected to source and drain regions of the semiconductor layer 42 through contact holes. The TFT is protected by a passivation layer 48. It is to be understood that the TFT described herein is an example and that other structures of TFTs may be used.

The first electrode 31, performing as the anode, is formed on the passivation layer 48, and a pixel definition layer 49 is formed on the first electrode 31 so as to cover the first electrode using an insulating material. A predetermined opening is formed in the pixel definition layer 49, and then, the organic light emitting layer 32 is formed on a region defined by the opening. In addition, the second electrode 33 is formed to cover an entire pixel region. It is to be understood that the organic light emitting device 30 described herein is an example and other structures of organic light emitting devices may be used In the AM type display apparatus, since the linear polarizing layer 22 and the quarter-wave retardation layer 21 are sequentially stacked on the substrate 20, the linear polarizing layer 22 and the quarter-wave retardation layer 21 can prevent the external light that strikes the lower portion of the substrate 20 from being reflected.

As in the other embodiments described herein, the linear polarizing layer 22 includes the grid 12 and the low-reflective members 13. The low-reflective members 13 minimize the reflection of the external light by the grid 12, and thus, improve the contrast of the AM type bottom emission organic light emitting apparatus.

In the AM type bottom emission organic light emitting display apparatus, the linear polarizing layer 22 and the quarter-wave retardation layer 21 can be formed on any surfaces formed by the substrate 20, the TFT, or the organic light emitting device 30 as long as the linear polarizing layer 22 is disposed to face the external light and the quarter-wave retardation layer 21 is disposed to face the organic light emitting device 30. For example, the AM type bottom emission organic light emitting display apparatus can include the structure shown in FIGS. 7 and 9, wherein the quarter-wave retardation layer 21 and the linear polarizing layer 22 are formed on the same or different surfaces of the substrate 20, and after that, the TFT and the organic light emitting device 30 can be formed thereon. Alternatively, the quarter-wave retardation layer 21 and/or the linear polarizing layer 22 can be disposed at interfaces between layers of the TFT.

For example, the linear polarizing layer 22 and the quarter-wave retardation layer 21 may be sequentially formed on the interlayer dielectric 45 to serve as the passivation layer 48, so that an additional passivation layer 48 on the TFT is not necessary.

Figure 22:
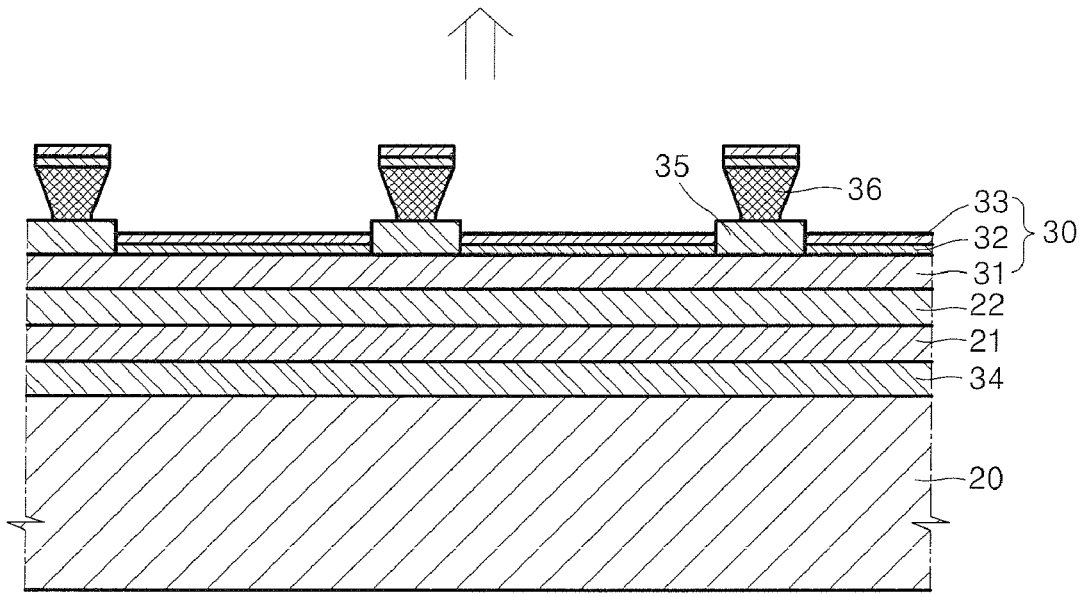
FIG. 22 is a schematic cross-sectional view of a PM type front emission organic light emitting display apparatus according to another embodiment of the present invention.

FIG. 22 is a schematic cross-sectional view of a PM type front emission organic light emitting display apparatus according to another embodiment of the present invention.

The reflective layer 34 is formed on the substrate 20, and the quarter-wave retardation layer 21 and the linear polarizing layer 22 are sequentially formed on the reflective layer 34. The organic light emitting device 30 is formed on the linear polarizing layer 22.

The structure of the linear polarizing layer 22 is the same as that of FIGS. 18 and 19, and detailed description for the linear polarizing layer 22 is not repeated. The first electrode 31 is formed on the linear polarizing layer 22 in a predetermined stripe pattern, and the internal insulating layer 35 is formed on the first electrode 31 so as to define the stripe pattern. In addition, the separator 36, which crosses the first electrode 31 at a right angle, is formed on the internal insulating layer 35 in order to pattern the organic light emitting layer 32 and the second electrode 33. The organic light emitting layer 32 and the second electrode 33 are patterned by the separator 36 to cross the first electrode 31. A sealing member (not shown) may be formed on the second electrode 33 to protect the organic light emitting device 30 from the external environment. If desired, the organic light emitting layer 32 and the second electrode 33 can be patterned without forming the separator 36.

According to the current embodiment, the external light incident from the lower portion of the substrate 20 is not reflected, and thus, the contrast can be improved and the thickness of the entire display apparatus can be reduced. In addition, the reflection of the external light by the grid can be minimized using the low-reflective members, and thus, the improvement of the contrast can be reinforced.

Although it is not shown in the drawings, the structures shown in FIGS. 10, 12, 14, 16, and 18 can be applied to the PM type front emission organic light emitting display apparatus.

Figure 23:
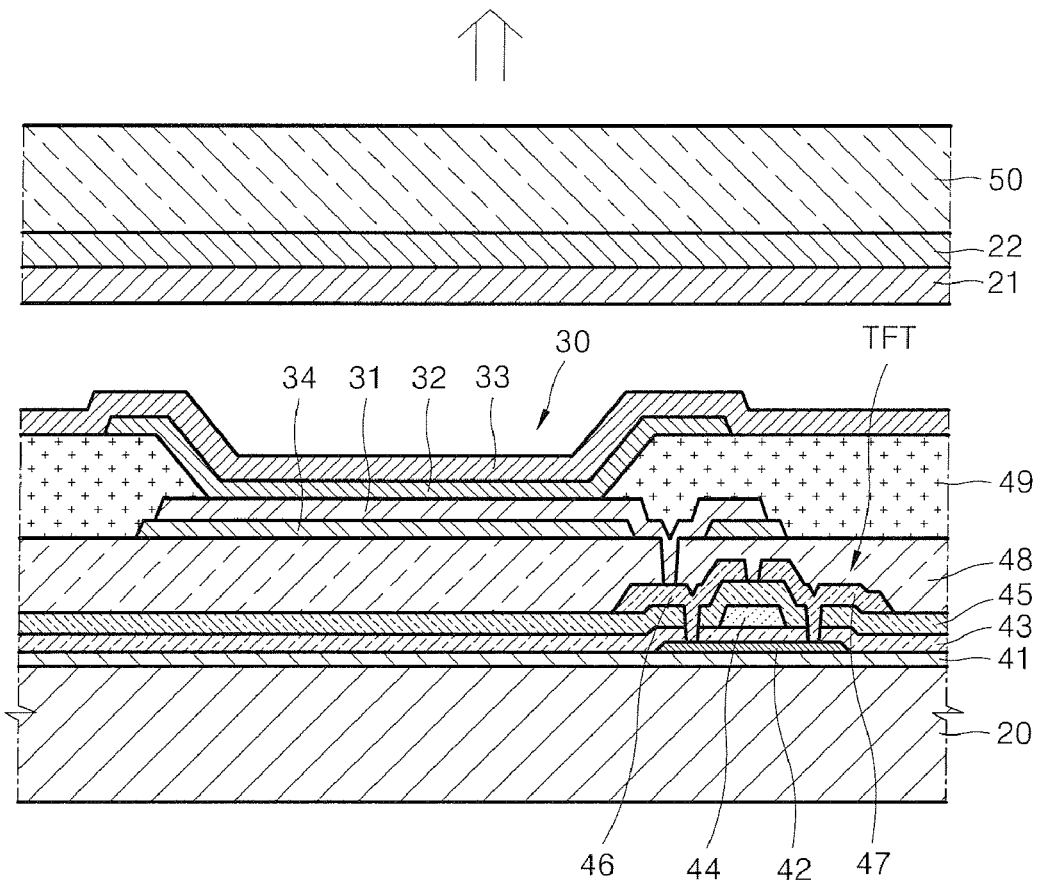
FIG. 23 is a schematic cross-sectional view of an AM type front emission organic light emitting display apparatus according to another embodiment of the present invention.

FIG. 23 is a schematic cross-sectional view of an AM type front emission organic light emitting display apparatus according to another embodiment of the present invention.

Referring to FIG. 23, the TFT is formed on the substrate 20. At least one TFT is formed on each pixel, and is electrically connected to the organic light emitting device 30. The structure of the TFT is the same as that of FIG. 21, and thus, detailed description for that is not repeated.

The passivation layer 48 is formed on the TFT to cover the TFT and the reflective layer 34 is formed on the passivation layer 48. In addition, the first electrode 31, performing as the anode, is formed on the reflective layer 34, and the pixel definition layer 49 is formed on the first electrode 31 to cover the first electrode 31 using the insulating material. A predetermined opening is formed in the pixel definition layer 49, and the organic light emitting layer 32 is formed on the region defined by the opening. In addition, the second electrode 33 is formed to cover an entire pixel region.

In the embodiment of FIG. 23, the linear polarizing layer 22 and the quarter-wave retardation layer 21 are sequentially formed on a surface of the sealing member 50, which faces the organic light emitting device 30, as in the embodiment of FIG. 12. The structure of the linear polarizing layer 22 is the same as that of FIG. 13, and detailed description of the linear polarizing layer 22 is not repeated.

The linear polarizing layer 22 and the quarter-wave retardation layer 21 can prevent the external light incident from the external portion of the front emission organic light emitting display apparatus (shown as the upper portion of the sealing member 50 in FIG. 23) from being reflected. In addition, the low-reflective members 13 can minimize the reflection of the external light by the grid 12, and thus, the improvement of the contrast can be reinforced.

Although it is not shown in the drawings, the structures of FIGS. 10, 12, 14, 16, and 18 can be applied to the AM type front emission organic light emitting display apparatus.

As described above, aspects of the present invention are not limited to organic light emitting display apparatuses. For example, a light emitting device according to aspects of the present invention can be other flat panel display apparatuses such as, for example, inorganic light emitting devices, liquid crystal displays, or electron emission devices.

The polarizer and the flat panel display apparatus according to aspects of the present invention can efficiently prevent the reflection of the external light and can improve the polarizing property of the display apparatus. Thus, the bright room contrast and the visibility of the display apparatus can be improved and the image quality of the display apparatus can be increased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An organic light emitting display apparatus comprising:
   a substrate;
   an organic light emitting device formed on the substrate to form images by directing light toward an exterior portion of the organic light emitting display apparatus;
   a sealing member formed on the organic light emitting device;
   a quarter-wave retardation layer formed on a surface of the substrate, a surface of the organic light emitting device, or a surface of the sealing member; and
   a linear polarizing layer formed on a surface of the substrate, a surface of the organic light emitting device, a surface of the sealing member, or a surface of the quarter-wave retardation layer,
   wherein the linear polarizing layer is located closer to the exterior portion toward which the light of the organic light emitting device is directed to form images than is the quarter-wave retardation layer, and
   wherein the linear polarizing layer includes a grid and low-reflective members stacked on the grid, wherein the low reflective members are closer to an incident direction of an external light than is the grid.

2. The display apparatus of claim 1, wherein the light of the organic light emitting device is directed toward the substrate to form images.

3. The display apparatus of claim 2, wherein the quarter-wave retardation layer is formed on the linear polarizing layer, and the organic light emitting device is formed on the quarter-wave retardation layer.

4. The display apparatus of claim 2, wherein the linear polarizing layer is formed on the substrate, the quarter-wave retardation layer is formed on the linear polarizing layer, and the organic light emitting device is formed on the quarter-wave retardation layer.

5. The display apparatus of claim 2, wherein the quarter-wave retardation layer is formed on the substrate, the organic light emitting device is formed on the quarter-wave retardation layer, and the linear polarizing layer is formed on a surface of the substrate that is opposite to the quarter-wave retardation layer.

6. The display apparatus of claim 2, wherein the quarter-wave retardation layer and the linear polarizing layer are formed on a surface of the substrate that is opposite to a surface where the organic light emitting device is formed.

7. The display apparatus of claim 1, wherein the light from the organic light emitting device is directed toward the sealing member to form images.

8. The display apparatus of claim 7, wherein the quarter-wave retardation layer is formed on the organic light emitting device, and the linear polarizing layer is formed on the quarter-wave retardation layer.

9. The display apparatus of claim 8, further comprising:
a protective layer between the organic light emitting device and the quarter-wave retardation layer.

10. The display apparatus of claim 7, wherein the quarter-wave retardation layer and the linear polarizing layer are sequentially formed on a surface of the sealing member that is opposite to a surface of the sealing member facing the organic light emitting device.

11. The display apparatus of claim 7, wherein the quarter-wave retardation layer s formed on the surface of the sealing member that faces the organic light emitting device, and the linear polarizing layer is formed on a surface of the sealing member that is opposite to the surface of the sealing member where the quarter-wave retardation layer is formed.

12. The display apparatus of claim 7, wherein the linear polarizing layer is formed on a surface of the sealing member that faces the organic light emitting device, and the quarter-wave retardation layer is formed on a surface of the linear polarizing layer that faces the organic light emitting device.

13. The display apparatus of claim 7, further comprising:
a reflective layer between the substrate and the organic light emitting device,
wherein the quarter-wave retardation layer is formed between the reflective layer and the organic light emitting device, and the linear polarizing layer is formed on the organic light emitting device.

14. The display apparatus of claim 1, wherein the grid comprises a plurality of parallel conductive wires and wherein the low-reflective members are stacked on the parallel conductive wires in the same pattern as that of the grid.

15. The display apparatus of claim 1, wherein the low-reflective member is formed of a material including CdSe, CdTe, or ruthenium.

16. The display apparatus of claim 1, wherein the low-reflective member includes an organic material.

17. The display apparatus of claim 1, wherein the low-reflective member includes an inorganic material.

18. The display apparatus of claim 1, wherein the low-reflective member includes a metal material and the organic material, and the metal and the organic material form a mixture.

19. The display apparatus of claim 1, wherein the low-reflective member includes a metal material and a material one selected from the group consisting of an organic material, an inorganic material, and a compound of the organic material and the inorganic material.

20. The display apparatus of claim 1, wherein the linear polarizing layer is formed on a surface of the substrate, a surface of the organic light emitting device, a surface of the sealing member, or a surface of the quarter-wave retardation layer without the presence of an adhesive layer.

\* \* \* \* \*

UNITED STATES PATENT AND TRADEMARK OFFICE
CERTIFICATE OF CORRECTION

PATENT NO. : 7,639,414 B2 Page 1 of 1
APPLICATION NO. : 11/837185
DATED : December 29, 2009
INVENTOR(S) : Kyu-Hwan Hwang et al.

It is certified that error appears in the above-identified patent and that said Letters Patent is hereby corrected as shown below:

Column 17, line 17, change "s" to --is--.

Signed and Sealed this

Twenty-third Day of March, 2010

David J. Kappos
*Director of the United States Patent and Trademark Office*